United States Patent
Aslan et al.

(10) Patent No.: US 7,461,974 B1
(45) Date of Patent: Dec. 9, 2008

(54) BETA VARIATION CANCELLATION IN TEMPERATURE SENSORS

(75) Inventors: Mehmet Aslan, Sunnyvale, CA (US); John W. Branch, Seattle, WA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 11/969,189

(22) Filed: Jan. 3, 2008

Related U.S. Application Data

(62) Division of application No. 10/865,609, filed on Jun. 9, 2004.

(51) Int. Cl.
*G01K 7/00* (2006.01)
(52) U.S. Cl. .................................. 374/178; 327/512
(58) Field of Classification Search ................. 374/178; 327/512
See application file for complete search history.

(56) References Cited

U.S. PATENT DOCUMENTS

| | | | |
|---|---|---|---|
| 2,946,008 A | 7/1960 | Kallmann | |
| 3,348,145 A | 10/1967 | Erath | |
| 3,350,641 A | 10/1967 | Lubkin et al. | |
| 3,566,162 A | 2/1971 | Warrender | |
| 3,678,294 A | 7/1972 | Glathe et al. | |
| 3,721,893 A | 3/1973 | Davis | |
| 3,781,648 A | 12/1973 | Owens | |
| 3,832,633 A | 8/1974 | Bowden | |
| 3,898,559 A | 8/1975 | Westra | |
| 4,061,959 A * | 12/1977 | Ahmed | 323/280 |
| 4,165,642 A | 8/1979 | Lipp | |
| 4,224,537 A | 9/1980 | Glazer | |
| 4,254,372 A | 3/1981 | Moore, Jr. | |

(Continued)

FOREIGN PATENT DOCUMENTS

DE 19710829.6 A1 9/1998

(Continued)

OTHER PUBLICATIONS

Office Action Mailed Aug. 4, 2008 in U.S. Appl. No. 11/767,467.*

(Continued)

*Primary Examiner*—Edward Lefkowitz
*Assistant Examiner*—Mirellys Jagan
(74) *Attorney, Agent, or Firm*—Girard & Equitz LLP

(57) ABSTRACT

An apparatus and method for canceling variations in the beta for a bipolar junction transistor so that the diode equation can be employed to accurately measure the temperature of the transistor based at least in part on a ratio of two target collector currents and two measurements of the base-emitter voltage of the transistor. If the determined collector current of the transistor is relatively equivalent to one of the first and second target collector currents, the transistor's base-emitter voltage is measured and stored. An analog feedback circuit can be employed to change the determined collector current to be relatively equivalent to the first and second target collector currents. The analog feedback circuit can include an optional sample and hold component to further reduce power consumption and reduce noise. A digital circuit can be employed to change the determined collector current to be relatively equivalent to the first and second target collector currents. Additionally, the transistor can be remotely located in another integrated circuit.

32 Claims, 12 Drawing Sheets

U.S. PATENT DOCUMENTS

| | | |
|---|---|---|
| 4,556,807 A | 12/1985 | Yamada et al. |
| 4,563,596 A | 1/1986 | Gosselin et al. |
| 4,636,092 A | 1/1987 | Hegyi |
| 4,713,783 A | 12/1987 | Fletcher |
| 4,727,269 A | 2/1988 | Luich |
| 4,801,878 A | 1/1989 | Peiffer et al. |
| 4,914,317 A | 4/1990 | Agiman |
| 4,996,580 A | 2/1991 | Kimura et al. |
| 5,029,277 A | 7/1991 | Kane |
| 5,124,575 A | 6/1992 | Rinderle et al. |
| 5,195,827 A | 3/1993 | Audy et al. |
| 5,258,703 A | 11/1993 | Pham et al. |
| 5,414,373 A | 5/1995 | Schreiber et al. |
| 5,448,174 A | 9/1995 | Gose et al. |
| 5,519,354 A | 5/1996 | Audy |
| 5,530,612 A | 6/1996 | Maloney |
| 5,686,858 A | 11/1997 | Malherbe et al. |
| 5,815,410 A | 9/1998 | Heinke et al. |
| 5,838,578 A | 11/1998 | Pippin |
| 5,857,777 A | 1/1999 | Schuh |
| 5,873,053 A | 2/1999 | Pricer et al. |
| 5,961,215 A | 10/1999 | Lee et al. |
| 5,982,221 A | 11/1999 | Tuthill et al. |
| 6,006,169 A | 12/1999 | Sandhu et al. |
| 6,008,685 A | 12/1999 | Kunst |
| 6,016,051 A | 1/2000 | Can |
| 6,019,508 A | 2/2000 | Lien et al. |
| 6,046,492 A | 4/2000 | Machida et al. |
| 6,097,239 A | 8/2000 | Miranda, Jr. et al. |
| 6,121,824 A | 9/2000 | Opris |
| 6,137,341 A | 10/2000 | Friedman et al. |
| 6,149,299 A | 11/2000 | Aslan et al. |
| 6,160,305 A | 12/2000 | Sanchez |
| 6,169,442 B1 | 1/2001 | Meehan et al. |
| 6,183,131 B1 | 2/2001 | Holloway et al. |
| 6,191,646 B1 | 2/2001 | Shin et al. |
| 6,232,829 B1 | 5/2001 | Dow |
| 6,242,974 B1 | 6/2001 | Kunst |
| 6,255,807 B1 | 7/2001 | Doorenbos et al. |
| 6,275,098 B1 | 8/2001 | Uehara et al. |
| 6,286,996 B1 | 9/2001 | Molander et al. |
| 6,292,011 B1 | 9/2001 | Wakabayashi et al. |
| 6,342,997 B1 | 1/2002 | Khadkikar et al. |
| 6,480,127 B1 | 11/2002 | Aslan |
| 6,554,469 B1 | 4/2003 | Thomson et al. |
| 6,637,934 B1 | 10/2003 | Henderson et al. |
| 6,674,185 B2 | 1/2004 | Mizuta et al. |
| 6,736,540 B1 | 5/2004 | Sheehan et al. |
| 6,812,722 B2 | 11/2004 | Throngnumchai et al. |
| 6,819,119 B2 | 11/2004 | Yamamoto et al. |
| 6,870,418 B1 | 3/2005 | Tang et al. |
| 6,890,097 B2 | 5/2005 | Tanaka et al. |
| 6,957,910 B1 | 10/2005 | Wan et al. |
| 7,010,440 B1 | 3/2006 | Lillis et al. |
| 7,030,793 B2 | 4/2006 | McLeod et al. |
| 7,048,438 B2 | 5/2006 | Breinlinger |
| 7,082,377 B1 | 7/2006 | Aslan et al. |
| 7,089,146 B1 | 8/2006 | D'Aquino et al. |
| 7,150,561 B1 | 12/2006 | D'Aquino et al. |
| 7,170,334 B2 | 1/2007 | Miranda et al. |
| 7,176,701 B2 | 2/2007 | Wachi et al. |
| 7,332,952 B2 | 2/2008 | McLeod et al. |
| 7,333,038 B1 | 2/2008 | Aslan |
| 2003/0031229 A1 | 2/2003 | Zhang et al. |
| 2003/0123520 A1 | 7/2003 | Tesi |
| 2004/0065900 A1 | 4/2004 | Umemoto et al. |
| 2005/0046463 A1 | 3/2005 | Throngnumchai et al. |
| 2005/0099752 A1 | 5/2005 | Liepold et al. |
| 2005/0259718 A1 | 11/2005 | Phan et al. |
| 2006/0029123 A1 | 2/2006 | Johnson |
| 2006/0071733 A1 | 4/2006 | Hsu |
| 2006/0093016 A1 | 5/2006 | McLeod et al. |
| 2006/0222049 A1 | 10/2006 | Cave |
| 2007/0217479 A1 | 9/2007 | Cave |

FOREIGN PATENT DOCUMENTS

| | | |
|---|---|---|
| JP | 04366737 | 12/1992 |
| JP | 07318609 A | 12/1995 |

OTHER PUBLICATIONS

Allan, Roger, editorial sponsored by Analog Devices Inc., "Design FAQs, Frequently Asked Questions: Temperature Sensors," Oct. 20, 2005, 2 pages, <http://www.elecdesign.com/Files/29/11082/11082_01.pdf>.

Analog Devices, Inc., "Intelligent Temperature Monitor and PWM Fan Controller ADM 1030," 2003, pp. 1-28.

Analog Devices, Inc., "Low-Noise, Precision Operational Amplifier OP27," 2003, pp. 1-20.

Bakker, A., "High-Accuracy CMOS Smart Temperature Sensors," 2000, pp. 106-116.

Filanovsky, M. et al., "BiCMOS bandgap voltage reference with base current compensation," INT. J. Electronics, 1996, vol. 81, No. 5, pp. 565-570.

Gray, P.R. et al., "Analysis and Design of Analog Integrated Circuits," Third Edition, 1993, pp. 454-460.

Hamidi, A. et al., "Contact termperature measurements on chip surface for reliability investigations of high power IGBT modules in traction applications," EuPac'98, 3rd European Conference on Electronic Packaging Technology and 9th International Conference on Interconnection Technology in Electronics, Jun. 1998, pp. 160-162.

Maxim Integrated Products, "Dual Remote/Local Temperature Sensors and Four-Channel Voltage Monitors," Rev. 1, May 2006, pp. 1-18.

Maxim Integrated Products, "Temperature Monitoring Using the MAX1253/54 and MAX1153/54," Mar. 21, 2003, 5 pages.

Meijer, G.C.M. et al., "Measurement of the temperature dependence of the Ic(Vbe) characteristics of integrated bipolar transistors," IEEE Journal of Solid-State Circuits, vol. SC-15, Issue 2, Apr. 1980, pp. 237-240.

National Semiconductor Corporation, "LM32 Dual Thermal Diode Temperature Sensor with SensorPath Bus," May 2004, pp. 1-24.

National Semiconductor Corporation, "LM34/LM35 Precision Monolithic Temperature Sensors," Oct. 1986, pp. 1-10.

National Semiconductor Corporation, "LM86 ±0.75° C Accurate, Remote Diode and Local Digital Temperature Sensor with Two-Wire Interface," Apr. 2003, pp. 1-21.

National Semiconductor Corporation, "LM95231 Precision Dual Remote Diode Temperature Sensor with SMBus Interface and TruThermae Technology," Aug. 2006, pp. 1-20.

National Semiconductor Corporation, "LM95235 Precision Remote Diode Temperature Sensor with SMBus Interface and TruThermae Technology," Jun. 2006, pp. 1-25.

Peppiette, G., "Temperature measurement on an IC-chip," Electronic Equipment News, vol. 15, Issue 11, Apr.-May 1974, p. 107.

Pertijs, M.A.P. et al., "37.2: Non-Idealities of Temperature Sensors using Substrate PNP Transistors," 2002, IEEE, pp. 1018-1023.

Pertijs, M.A.P. et al., "A CMOS Smart Temperature Sensor With a 3σ Inaccuracy of ±0.1° C From -55 ° C to 125 ° C," IEEE Journal of Solid-State Circuits, vol. 40, No. 12, Dec. 2005, pp. 2805-2815.

Pertijs, M.A.P. et al., "A high-accuracy temperature sensor with second-order curvature correction and digital bus interface," IEEE, vol. 1, May 2001, pp. I-368-I-371.

Pertijs, M.A.P. et al., "Precision Temperature Measurement Using CMOS Substrate PNP Transistors," IEEE Sensors Journal, vol. 4, No. 3, Jun. 2004, pp. 294-300.

University of Delaware, Department of Physics & Astronomy, "The bipolar transistor," 7 pages, <http://www.physics.udel.edu/~nowak/phys645/The_bipolar_transistor.htm>.

Analog Devices, Inc., Data Sheet for "ADM1032, +/-1 degree Celsius Remote and Local System Temperature Monitor," 2001, 12 pages.

Office Action Mailed Mar. 11, 2008 in U.S. Appl. No. 11/767,467.

* cited by examiner

BETA VARIATION CANCELLATION IN TEMPERATURE SENSORS

CROSS-REFERENCE TO RELATED APPLICATIONS

This utility patent application is a divisional of U.S. patent application Ser. No. 10/865,609 filed Jun. 9, 2004, the benefit of which is hereby claimed under 35 U.S.C. §120(e), and is related to U.S. patent application Ser. No. 11/767,467 filed Jun. 22, 2007, both of which are further incorporated herein by reference.

FIELD OF THE INVENTION

The invention is generally directed to the measuring the temperature of an electronic device, and more particularly, to improving the accuracy of measuring a temperature signal provided by a transistor disposed in an electronic device.

BACKGROUND OF THE INVENTION

An electronic temperature sensor circuit can be arranged to measure the temperature on a remote (separate) silicon chip by providing one or more known currents to a p-n junction located on the remote chip. This circuit measures a diode voltage of this p-n junction and processes the diode voltage to determine the actual temperature at the remote location. Most p-n junctions employed for this purpose are parasitic vertical p-n-p silicon based transistors. Also, the temperature sensor circuit is usually arranged to control the emitter currents of the transistor.

The classic diode equation is often employed to determine the actual temperature at the remotely located p-n-p transistor based on a ratio of approximated collector currents. So long as the emitter current and collector current are substantially equivalent for this remotely located transistor, the determined temperature can be relatively arcuate. However, if the beta (ratio of collector current over base current) of the p-n-p transistor varies with a varying emitter current, a determined temperature based on the diode equation can be less accurate. Recently, process variations and the ever shrinking physical size of process geometries for silicon devices are causing the beta to vary significantly with a varying emitter current.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

Figure 1:
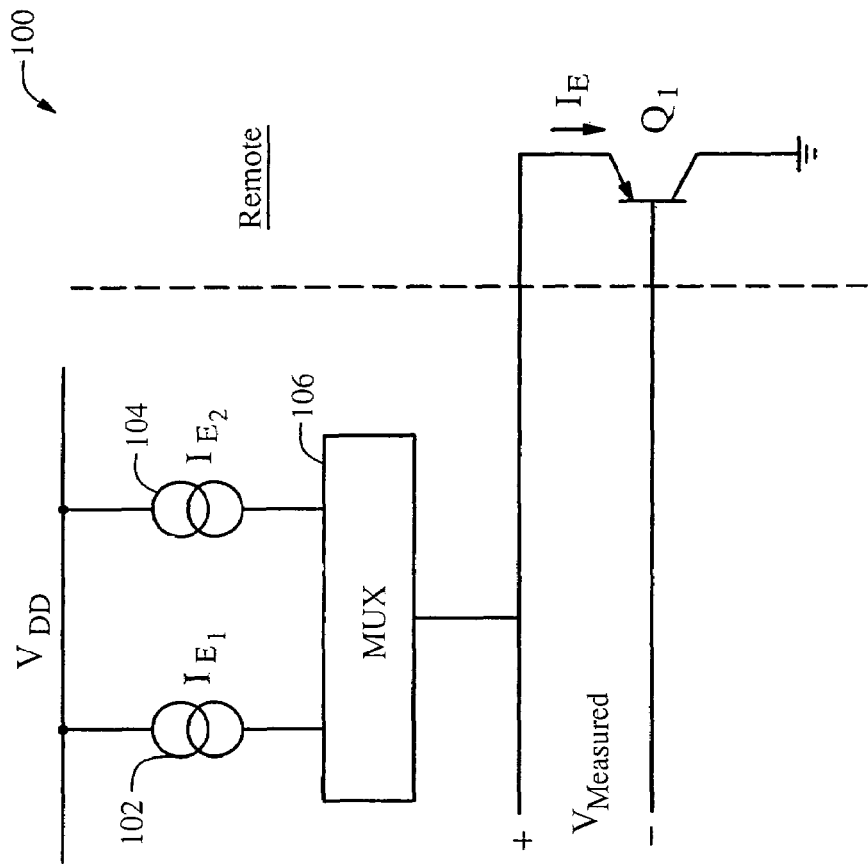
FIG. 1 illustrates a schematic diagram of an exemplary circuit that provides two known emitter currents for a remotely located transistor.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Briefly stated, the present invention is directed to an apparatus and method for canceling variations in the beta for a transistor so that the diode equation can be employed to accurately measure the temperature of the transistor based at least in part on a ratio of two target collector currents (Ictarget1, Ictarget2) and two measurements of the base-emitter voltage (Vbe1, Vbe2) of the transistor. If the determined collector current of the transistor is relatively equivalent to one of the first and second target collector currents, the transistor's base-emitter voltage is measured and stored. An analog feedback circuit can be employed to change the determined collector current to be relatively equivalent to the first and second target collector currents. The analog feedback circuit can include an optional sample and hold component to further reduce power consumption and reduce noise. A digital circuit can be employed to change the determine collector current to be relatively equivalent to the first and second target collector currents. Additionally, the transistor whose currents are measured/determined to determine its temperature can be remotely located in another integrated circuit (chip) or disposed in the same integrated circuit as the invention.

The classic diode equation determines a change in the base emitter voltage (ΔVbe) for a p-n-p transistor as follows:

$$\Delta Vbe = \eta \frac{\kappa T}{q} \ln\left(\frac{Ic1}{Ic2}\right) \qquad \text{Equation 1}$$

wherein η is a non-ideality constant substantially equivalent to 1.00 or slightly more/less, κ is the well known Boltzmann's constant, q is the electron charge, T is the temperature in Kelvin, Ic1 is a first collector current, and Ic2 is a second collector current that are present at the measurement of a first base-emitter voltage and a second base-emitter voltage.

In the past, since a ratio of collector currents tended to be relatively equivalent to a ratio of known emitter currents (Ie), the diode equation could be accurately approximated in a rewritten form that follows:

$$T = \Delta Vbe \bigg/ \left(\eta \frac{\kappa}{q} \ln\left(\frac{Ie1}{Ie2}\right)\right); \text{ where } \frac{Ic1}{Ic2} = \frac{Ie1}{Ie2} \qquad \text{Equation 2}$$

However, due in part to process variations for integrated circuits with smaller process geometries, the assumption regarding relatively equivalent ratios may no longer be valid. The beta (ratio of collector current over base current) has been shown to vary as much as 10 percent or more between two known emitter currents for p-n-p transistors in integrated circuits manufactured from relatively smaller process geometries.

In an exemplary integrated circuit based on a smaller die size, a beta of 0.77 was measured for a 10 microamp emitter current provided to a transistor. For the same transistor, the measured beta was 0.83 when the emitter current was changed to 170 microamps. Thus, the diode equation approximation (Equation 2) regarding the ratios of collector and emitter currents for a transistor can cause relatively inaccurate temperature measurements in an integrated circuit based on smaller process geometries. Relatively significant inaccurate temperature measurements can occur in integrated circuits that have process geometries of 90 nanometers or less.

The invention provides for a more accurate temperature measurement for a transistor with a rewritten form of the diode equation (Equation 3) that provides for actually measuring or controlling the ratio of collector currents instead of the ratio of emitter currents.

$$T = \Delta Vbe \bigg/ \left(\eta \frac{\kappa}{q} \ln\left(\frac{Ic1}{Ic2}\right)\right) \qquad \text{Equation 3}$$

FIG. 1 illustrates a schematic diagram of overview 100 for an exemplary circuit that provides two known emitter currents for a remotely located p-n-p transistor (Q1). Current sources 102 and 104 are separately coupled between a voltage source (Vdd) and multiplexer 106. As each current source is selected, it provides a known emitter current to the remotely located transistor Q1. The provided emitter currents induce base-emitter voltages across the transistor that can be measured (Vmeasured) and employed to determine the temperature based on an approximation of the diode equation (Equation 2).

Figure 2:
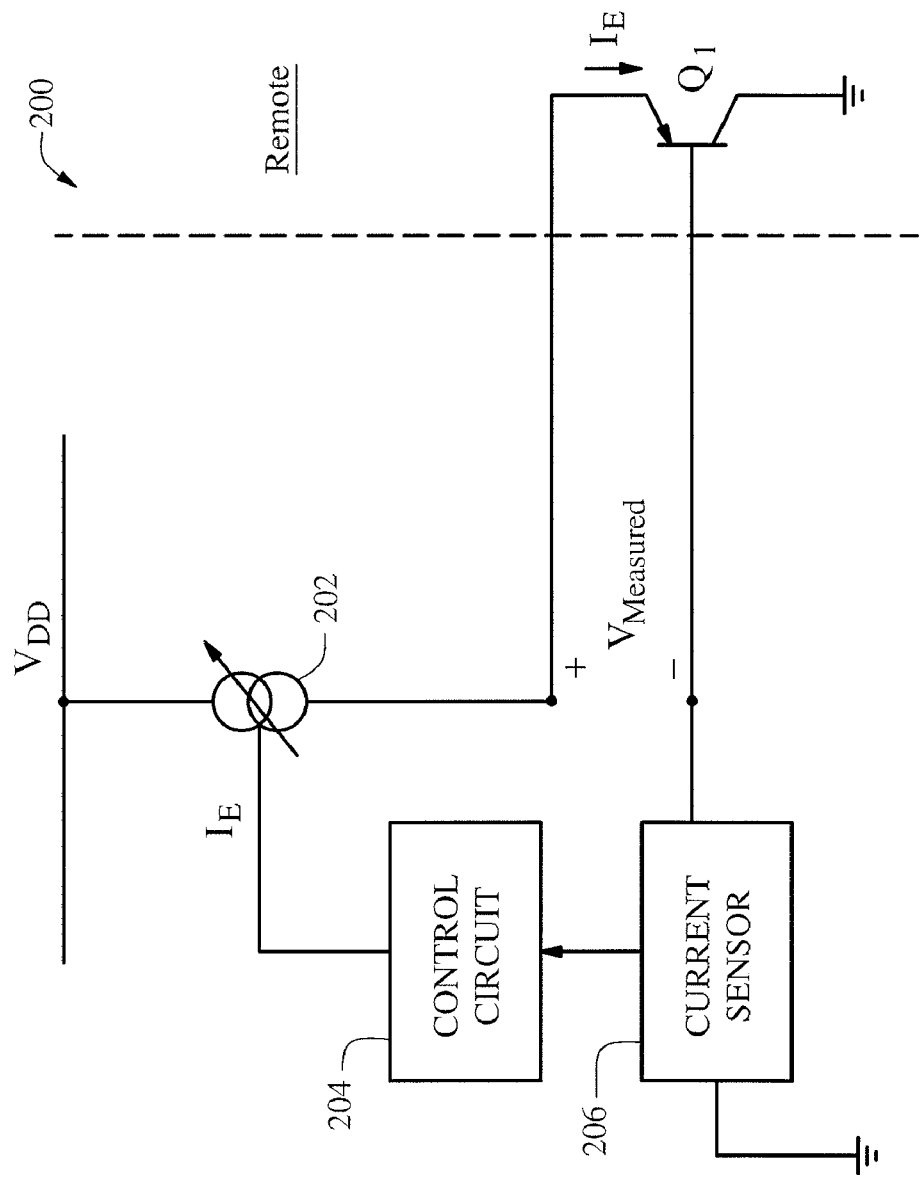
FIG. 2 shows a schematic diagram of an exemplary circuit for determining collector currents for a remotely located transistor.

FIG. 2 shows a schematic diagram of general overview 200 of components for determining collector currents for a remotely located transistor Q1. Current sensor 206 is coupled to the base of transistor Q1 where it is employed to measure the base current of this transistor. Current sensor 206 provides the measured base current to control circuit 204 which in turn controls the operation of variable current source 202. For two separate ranges of emitter current, the variable current source is varied so that the determination of the collector current (Icurrent=Iemitter−Ibase) is equivalent to a first target (predetermined) collector current and a second target collector current. The base-emitter voltage (Vmeasured) for the remotely located transistor Q1 is measured when the determined collector current is equivalent to one of the target collector currents. The arrangement of these components enable for temperature for a remotely located transistor to be determined based on an actual ratio of predetermined target collector currents, not an approximation. Additionally, substantially the same arrangement of these components could be employed to determine the temperature of a transistor that was disposed locally, i.e., the transistor can be disposed in the same integrated circuit as the components employed to measure its currents.

Figure 3A:
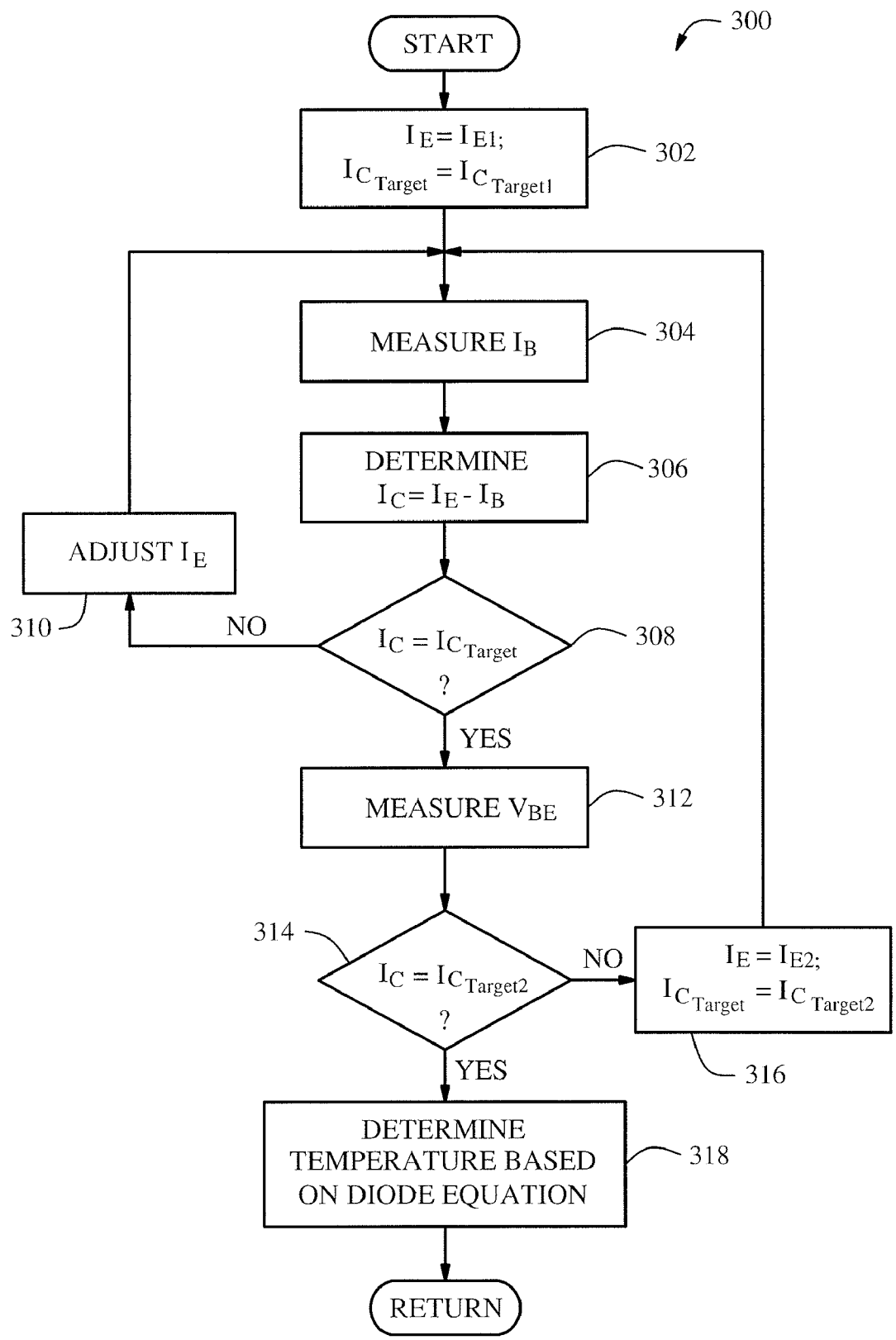
FIG. 3A illustrates a flow chart for determining the temperature of a remotely located transistor based on separate measurements of its base-emitter voltage for two determined target collector currents.

FIG. 3A illustrates a flow chart for determining the temperature of a remotely located transistor based on separate measurements of its base-emitter voltage for two iteratively determined target collector currents. Moving from a start block, the process steps to block 302 where the emitter current provided to the remotely located transistor is adjusted to a first value. Also, a first target value is provided for comparing to a determined collector current. At block 304, the base current for the remotely located transistor is measured. Flowing to block 306, the collector current is determined by the difference between the first value of the emitter current and the measured base current, i.e., Ic=Ie−Ib. Advancing to decision block 308, a determination is made as to whether or not the determined collector current is equivalent to the first target value. If false, the process moved to block 310 where the emitter current is adjusted. Next, the process returns to block 304 and performs substantially the same actions discussed above. This process substantially loops until the determined collector current is relatively equivalent to the first target value.

If the determination at decision block 308 has been true, the process would have stepped to block 312 where the base-emitter voltage of the remotely located transistor for the first target value would be measured and stored. Moving to decision block 314, another determination is made as to whether or not the value of the determined collector current is equivalent to a second target value. If false, the process steps to block 316 where the second target value is provided for comparing to the determined collector current. The process returns to block 304 and performed substantially the same actions discussed above except for the second target value.

Once the determination at decision block 314 is true, the process moves to block 318 where the diode equation (discussed above) is employed to determine the temperature of the remotely located transistor based on the measured base-emitter voltages for two predetermined (target) values for the collector currents. Next, the process returns to performing other actions.

The determined temperature may be converted into a representation of the temperature that may be displayed or employed by other devices to control the temperature of the integrated circuit that includes the remotely located transistor. Additionally, substantially the same process can be employed to determine the temperature of a transistor that is disposed locally, i.e., in the same integrated circuit as the components employed to measure the transistor's currents.

Figure 3B:
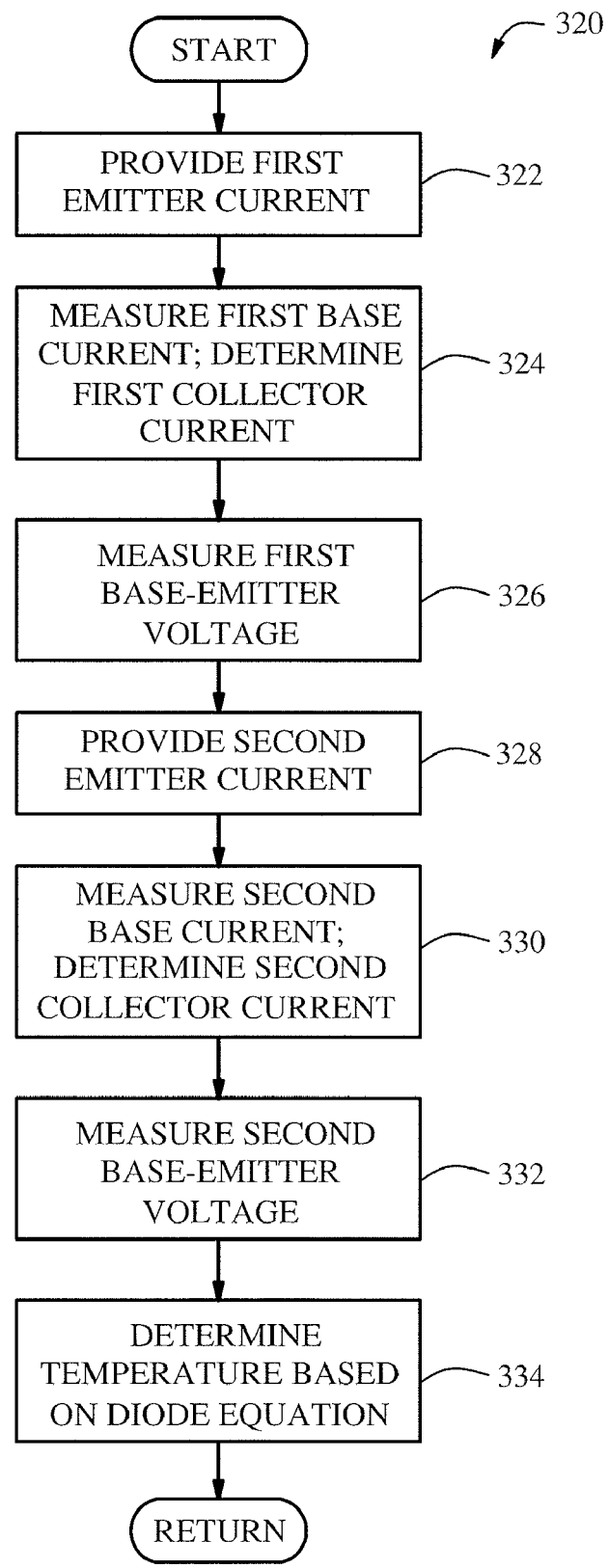
FIG. 3B illustrates a flow chart for determining the temperature of a remotely located transistor based on separate measurements of its base-emitter voltage for two determined collector currents.

FIG. 3B illustrates a flow chart for determining the temperature of a remotely located transistor based on separate measurements of its base-emitter voltage for two determined collector currents. Moving from a start block, the process steps to block 322 where a first emitter current that has a known value, e.g., "X" milliamps, is provided to the remotely located transistor. At block 324, a first base current is measured. Also, the known first emitter current and the measured first base current are employed to determine a first collector current, i.e., the collector current is equivalent to the emitter current minus the base current. Moving to block 326, the process measures a first base-emitter voltage for the transistor.

Next, the process advances to block 328 where a second emitter current that has a known value, e.g., "Y" milliamps, is provided to the remotely located transistor. At block 330, a second base current is measured. Also, the known second emitter current and the measured first base current are employed to determine a second collector current. Stepping to block 332, the process measures a second base-emitter voltage for the transistor. Flowing to block 334, the process employs the diode equation to determine the temperature of the transistor which is based in part on a ratio of the determined first and second collector currents and the difference between the first and second measured base-emitter voltage. Next, the process returns to performing other actions.

The determined temperature may be converted into a representation of the temperature that may be displayed or employed by other devices to control the temperature of the integrated circuit that includes the remotely located transistor. Additionally, substantially the same process can be employed to determine the temperature of a transistor that is disposed locally, i.e., in the same integrated circuit as the components employed to measure the transistor's currents.

Figure 4A:
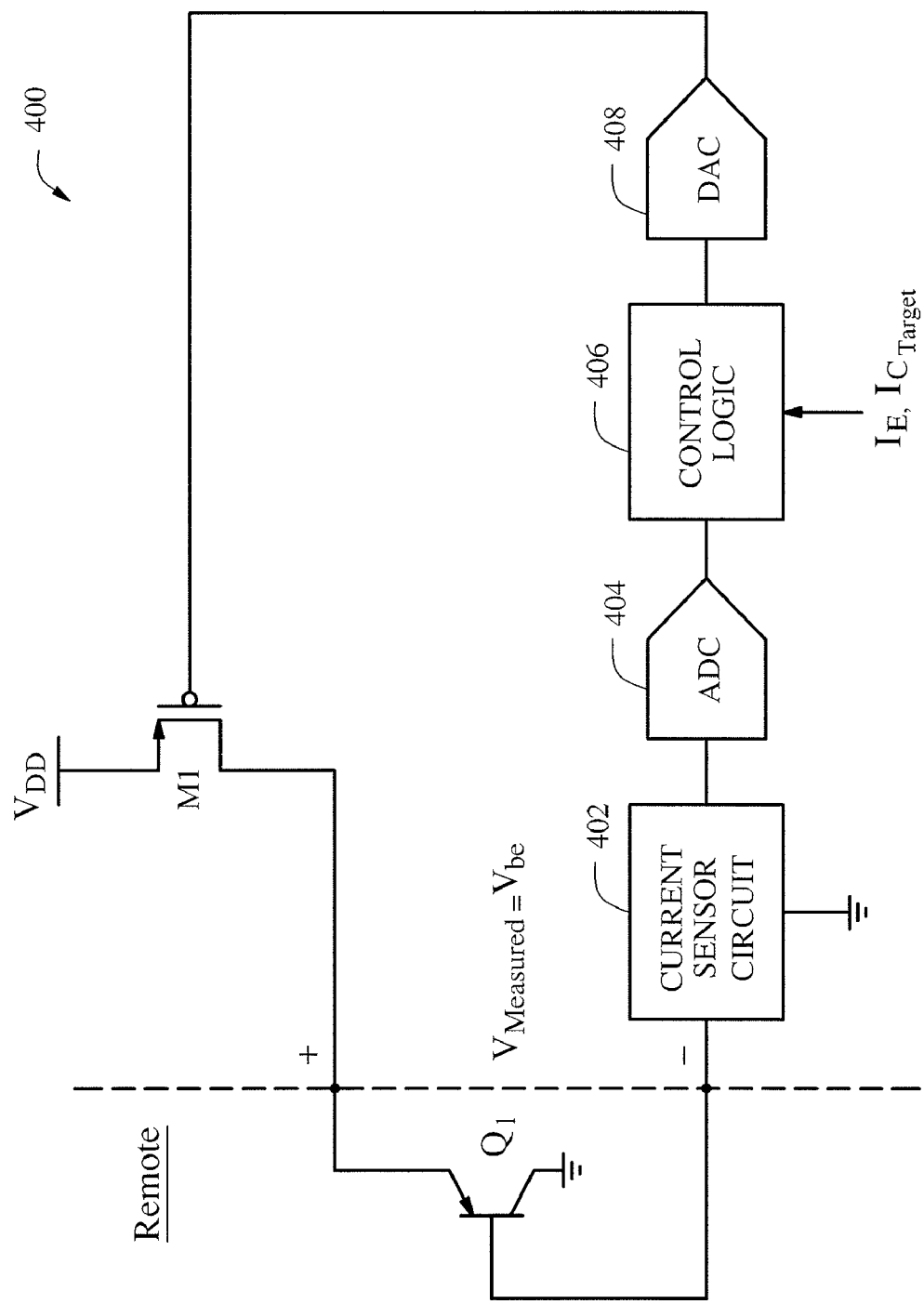
FIG. 4A illustrates a schematic diagram of an exemplary circuit that employs digital components to determine target collector currents for a remotely located transistor.

FIG. 4A illustrates a schematic diagram of overview 400 for employing digital components to determine collector currents for a remotely located transistor Q1 in accordance with the process discussed above for FIG. 3A. Current sensor circuit 402 measures the base current for transistor Q1 and converts the measured current into an analog voltage signal. This voltage signal is provided to analog-to-digital converter (ADC) 404 where the analog signal is converted into the digital domain. ADC 404 provides this digitalized signal to control logic 406. Also, control logic 406 receives a value of the emitter current presently provided to transistor Q1 and a target value (first or second) for the determined collector current.

Control logic 406 is coupled to digital-to-analog converter (DAC) 408 and provides a digital signal to the DAC to increase, decrease, or remain constant in regard to the emitter current for transistor Q1. The analog output signal from DAC 408 is coupled to the gate of MOSFET M1 which in turn provides the emitter current to transistor Q1. Changes in the analog signal output of DAC 408 causes MOSFET M1 to either increase or decrease the emitter current provided to transistor Q1. Additionally, substantially the same arrangement of these components in FIG. 4A could be employed to determine the temperature of a transistor that is disposed locally, i.e., the transistor can be disposed in the same integrated circuit as the components employed to measure its currents.

Figure 4B:
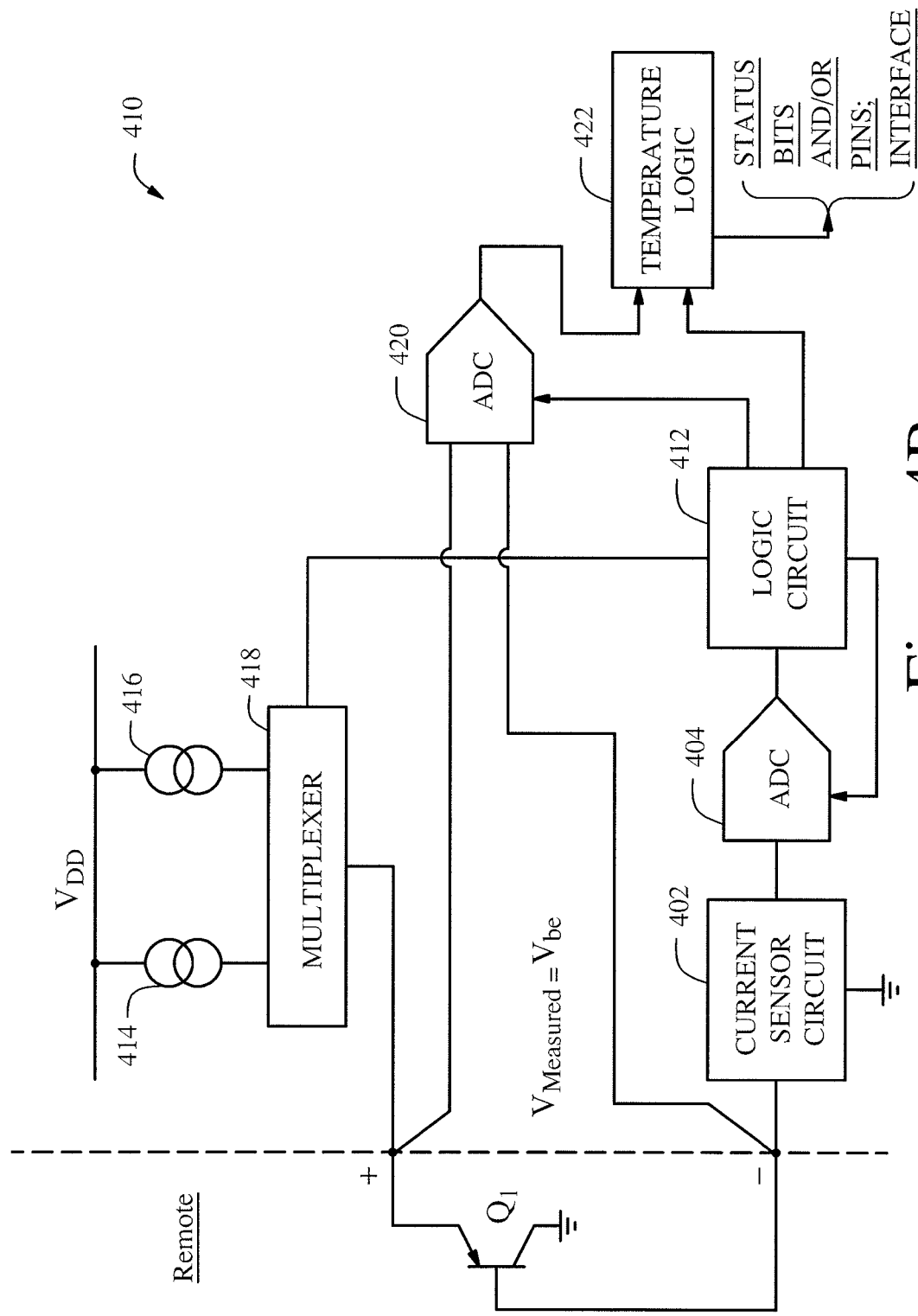
FIG. 4B shows a schematic diagram of an exemplary circuit that employs digital components to determine collector currents for a remotely located transistor.

FIG. 4B illustrates a schematic diagram of overview 410 for employing digital components to determine collector currents for a remotely located transistor Q1 in accordance with a process discussed above for FIG. 3B. Current sensor circuit 402 measures the base current for transistor Q1 and converts the measured current into an analog voltage signal. This voltage signal is provided to analog-to-digital converter (ADC) 404 where the analog signal is converted into the digital domain. ADC 404 provides this digitalized signal to logic circuit 412. An output of logic circuit 412 is coupled back to ADC 404 to save power by de-energizing the ADC if it is not actively employed to measure the base current. Known emitter currents are separately provide to transistor Q1 by current sources 414 and 416 through multiplexer 418. An analog-to-digital converter (ADC) 420 is coupled across the base and emitter of the remotely located transistor Q1 for measuring the transistor's base-emitter voltage. Another output of logic circuit 412 is coupled to ADC 420 to save power by de-energizing this ADC if it is not actively employed to measure the base-emitter voltage current. The output of ADC 420 and another output of logic circuit 412 are coupled to temperature logic 422 to determine the temperature of transistor Q1 and provide a representation of the determined temperature with status bit(s), pin(s) serial interface(s), parallel interface(s) bus(es), and the like.

In one embodiment, the resolution for ADC 404 to measure the base current might be configured to be substantially less than the resolution of ADC 420 to measure the base-emitter voltage of transistor Q1. Also, since the first and second determined collector currents are employed to determine temperature, gain correction is automatically provided for measuring the base-emitter voltage of the transistor Q1, i.e., increase, decrease, or remain constant based on the determined collector current of the transistor. Also, in yet another embodiment, a variable current source could be employed to perform substantially the same actions as current sources 414 and 416 and multiplexer 418.

Additionally, substantially the same arrangement of these components in FIG. 4B could be employed to determine the temperature of a transistor that is disposed locally, i.e., the transistor can be disposed in the same integrated circuit as the components employed to measure its currents.

Figure 5:
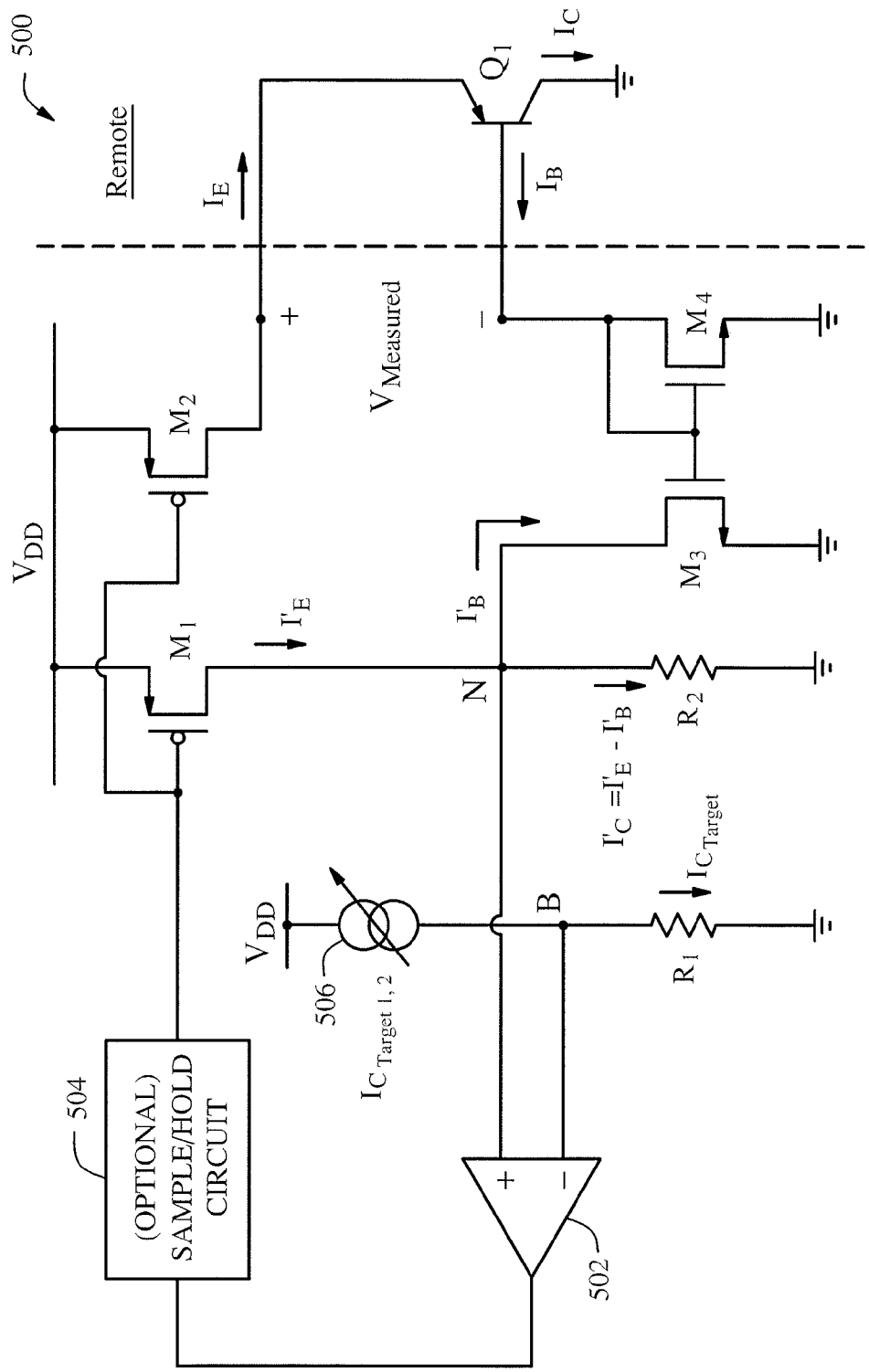
FIG. 5 illustrates a schematic diagram of an exemplary circuit that employs analog components to determine collector currents for a remotely located transistor.

FIG. 5 illustrates a schematic diagram of overview 500 for employing analog components to determine collector currents for a remotely located transistor Q1 in accordance with the process discussed above. A pair of substantially matched MOSFET transistor M1 and M2 have their sources coupled to a voltage supply (Vdd) and their gates coupled to an output of opamp 502. The drain of MOSFET M2 is coupled to the emitter of remotely located transistor Q1 and arranged to provide an emitter current (Ie). The drain of MOSFET M1 is similarly arranged to provide a relatively equivalent current (Ie') to a node "N", i.e., Ic'=Ic.

Node N is coupled to the non-inverting input of opamp 502, an end of resistor R2 (other end of resistor R2 is coupled to ground) and the drain of MOSFET M3. MOSFETs M4 and M3 are substantially matched to each other and configured in a current mirror arrangement where their sources are coupled to ground and their gates are coupled together. Further, the gate of MOSFET M4 is coupled to its drain and the base of remotely located transistor Q1 so that the base current Ib of transistor Q1 is mirrored by another current Ib' flowing through MOSFET M3, i.e., Ib=Ib'. Since the non-inverting input to opamp 502 has a relatively infinite impedance at Node N, the current (Ic') that flows trough transistor R2 is equivalent to Ie'−Ib', which in turn is relatively equivalent to the collector current. One terminal of variable current source 506 is coupled to the voltage supply (Vdd) and another terminal of the variable current source is coupled to Node "B" to both an end of resistor R1 and the inverting input to opamp 502. The other end of resistor R1 is coupled to ground; and the impedance values of resistors R1 and R2 are relatively equivalent to each other. However, in another embodiment, the impedances of resistors R1 and R2 can be significantly different values so long as a ratio of their impedances is known, e.g., the impedance of R1 could be equivalent to several multiples of the impedance of R2, and vice versa.

Since the inverting input to opamp 502 has a relatively infinite impedance, a target collector current (Ictarget) provided by the variable current source flows primarily through resistor R1 to ground. Based on the difference in voltage drops at its non-inverting and inverting inputs caused by the flow of Ictarget through resistor R1 and the flow of Ic' through resistor R2, opamp 502 adjusts its output to drive the gates of MOSFETs M1 and M2 until these voltage drops are relatively equivalent, such that Ic'=Ictarget. Once Ic' is relatively equivalent to Ictarget, the base-emitter voltage (Vmeasured) for transistor Q1 is measured for a first target collector current. This process is repeated for a second target collector current and a second measurement of the base-emitter voltage for transistor Q1 is performed. Additionally, once Ic' is adjusted to be relatively equivalent to a target collector current (Ictarget), optional sample and hold circuit 504 enables the base-emitter voltage of transistor Q1 to be measured while at least opamp 502 is de-energized to conserve power and reduce noise. Furthermore, the diode equation can be employed to determine the temperature of transistor Q1 based on the two measurements of the base-emitter voltage for this transistor and a ratio of the two target collector currents (Ictarget1 and Ictarget2). Additionally, substantially the same arrangement of these components could be employed to determine the temperature of a transistor that is disposed locally, i.e., the transistor can be disposed in the same integrated circuit as the component employed to measure its currents.

Figure 6:
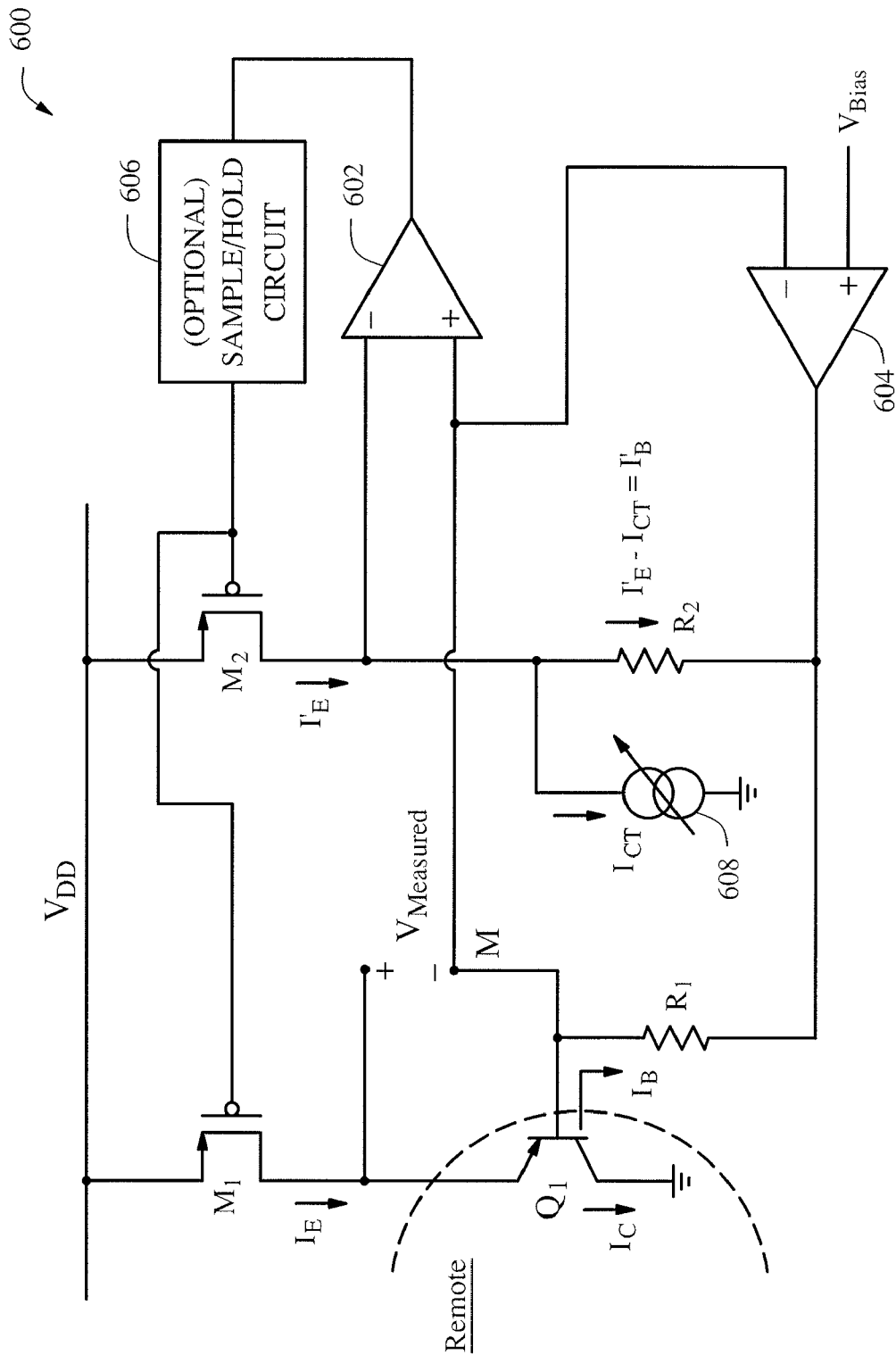
FIG. 6 illustrated a schematic diagram of an exemplary circuit that employs analog components to determine collector currents for a biased and remotely located transistor.

FIG. 6 illustrates a schematic diagram of overview 600 for employing analog components to determine collector currents for a biased and remotely located transistor Q1 in accordance with the process discussed above. The operation of this embodiment is similar in some ways to the embodiment discussed in FIG. 5, albeit different in other ways such as biasing. The source of a ratio of substantially matched MOSFET transistors M1 and M2 are coupled to a voltage supply (Vdd) and both of their gates are coupled to an output of opamp 602. The drain of MOSFET M1 is coupled to the emitter of remotely located transistor Q1 and arranged to provide an emitter current (Ie) to this transistor. The drain of MOSFET M2 is similarity arranged to provide a relatively equivalent current (Ie'=Ie) at one end of resistor R2 and the inverting input of opamp 602. This particular end of resistor R2 is also coupled to one terminal of variable current source 608 whose other terminal is coupled to ground. Also, the other end of resistor R2 is coupled to the output of bias opamp 604.

At Node M, the base of transistor Q1 is coupled to one end of resistor R1 whose other end is coupled to the output of bias opamp 604. Also, the base of transistor Q1 is coupled to the non-inverting input of opamp 602 and the inverting input of bias opamp 604. The impedance values for resistors R1 and R2 are substantially equivalent to each other. Also, a bias voltage Vbias is coupled to the non-inverting input of bias opamp 604.

In operation, Vbias is applied to the non-inverting input of bias opamp 604 to bias the operation of the listed components above the common mode voltage and MOSFET M1 provides the emitter current (Ie) to the remotely located transistor Q1 so that a base current (Ib) flows through resistor R1. A similar current (Ie') is provided by MOSFET M2 to the other components in the circuit such that variable current source 608 sinks a target collector current (Ictarget) and the current (Ib') flowing through resistor R2 is substantially equivalent to Ie' Ictarget. The output of opamp 602 is adjusted until the base current (Ib) flowing through resistor R1 is relatively equivalent to the current (Ib') flowing through resistor R2 for the target collector current (Ictarget).

Additionally, the operation of bias opamp 604 ensures that the voltage at Node M (base of transisotr Q1) is relatively equivalent to a predetermined bias voltage Vbias. Also, the operation of opamp 602 ensures that the collector current for the remotely located transistor Q1 is adjusted to the value of the target collector current.

Once Ib' is relatively equivalent to Ib, the base-emitter voltage (Vmeasured) for transistor Q1 is measured for a first target collector current. This process is repeated for a second target collector current and a second measurement of the base-emitter voltage for transistor Q1 is performed. Additionally, once Ib' is adjusted to be relatively equivalent to Ib for a given target collector current (Ictarget), optional sample and hold circuit 606 enables the base-emitter voltage of transistor Q1 to be measured while at least opamp 602 is de-energized to conserve power and to reduce noise. Furthermore, the diode equation can be employed to determine the temperature of transistor Q1 based on the two measurements of the base-emitter voltage for this transistor and a ratio of the two target collector currents (Ictarget1 and Ictarget2). Additionally, substantially the same arrangement of these components could be employed to determine the temperature of a transistor that is disposed locally, i.e., the transistor can be displayed in the same integrated circuit as the components employed to measure its currents.

Figure 7:
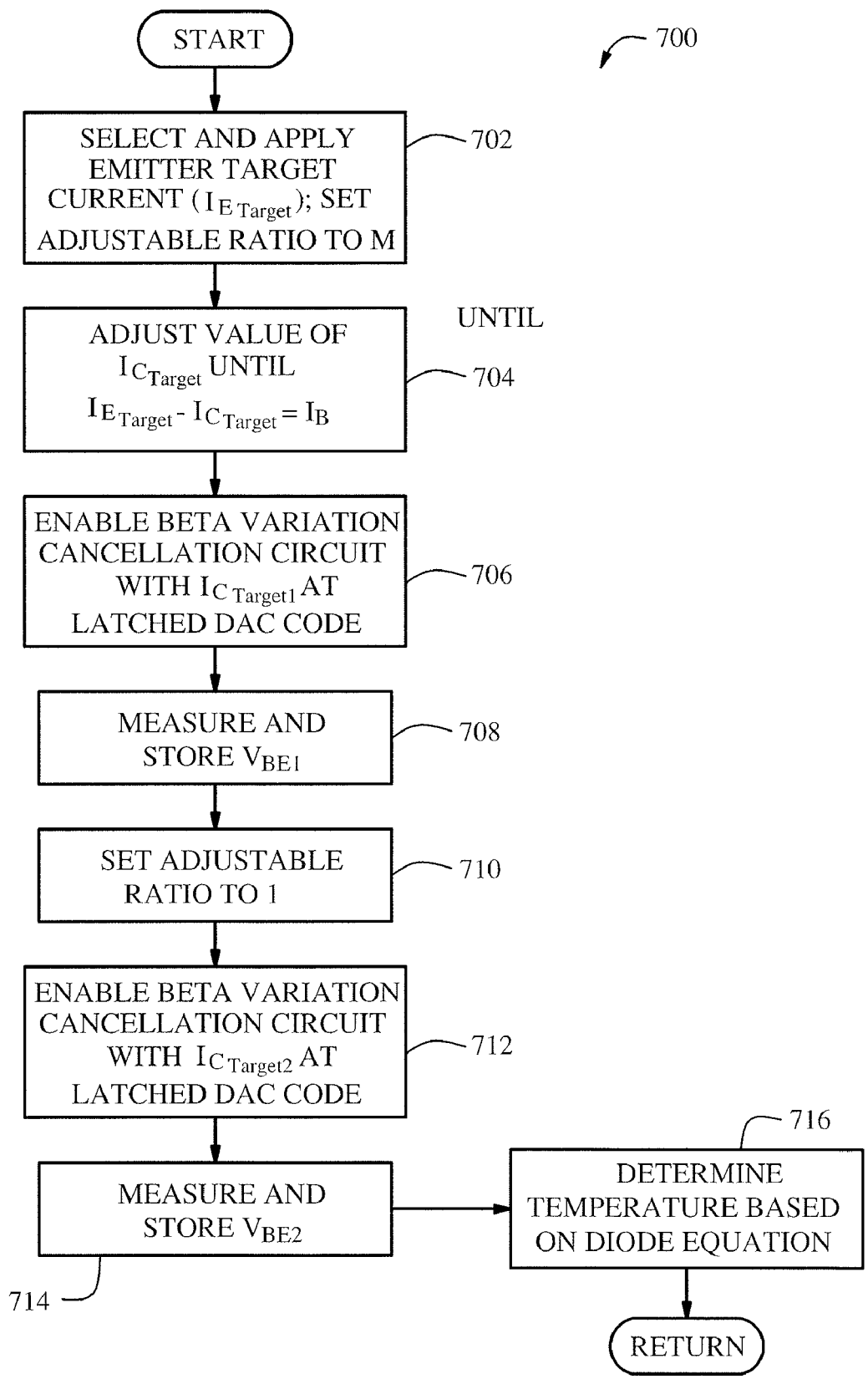
FIG. 7 illustrates a flow chart for determining two target collector currents that can be employed in the determination of the temperature for a remotely located transistor.

FIG. 7 illustrates a flow chart for determining two target collector currents that can be employed in the determination of the temperature for a remotely located transistor. Moving from a start block, the process steps to block 702 where a target emitter current is selected and applied to the remotely located transistor and other components employed to measure at least one of this transistor's collector and base currents. Also, an adjustable ratio of one MOSFET transistor in a current mirror that provides a target collector current is set equal to M where M is equivalent to a ratio of a first target collector current over a second target collector current. In one embodiment, M is set equal to 16.

At block 704, the process adjusts the value of the target collector current until the target emitter current minus the target collector current is equivalent to the base current of the remotely located transistor. Also, the code for a Digital to Analog Converter (DAC) that enables the adjustment of the target collector current is set equal to zero; and the DAC code is incremented until a comparator changes state and indicates that the base current of the remotely located transistor is equivalent to the target emitter current minus the target collector current. This increment DAC code is latched at the state change of the comparator.

Moving to block 706, the process enables an exemplary beta variation cancellation circuit with a first target collector current that is equivalent to the Ictarget at the latched DAC code. Exemplary beta variation cancellation circuits and their operation are taught in FIGS. 2, 4-6, and 8-9 and the related discussion. At block 708, the base-emitter voltage Vbe1 for the first target collector current (Ictarget1) is measured and stored.

Advancing to block 710, the process changes the adjustable ratio from M to one for the one MOSFET transistor in the current mirror that provides the target collector current so that the second target collector current is substantially smaller than the first target collector current. At block 712, the process enables an exemplary beta variation cancellation circuit with a second target collector current that is equivalent to the Ictarget at the second latched DAC code. At block 714, the base-emitter voltage Vbe2 for the second target collector current (Ictarget2) is measured and stored. Next, the process steps to block 716 where the diode equation is employed to determine the temperature of the remotely located transistor. The process subsequently returns to performing other actions. Additionally, substantially this same process could be employed to determine the temperature of a transistor that is disposed locally, i.e., the transistor can be disposed in the same integrated circuit as the components employed to measure its currents.

Figure 8:
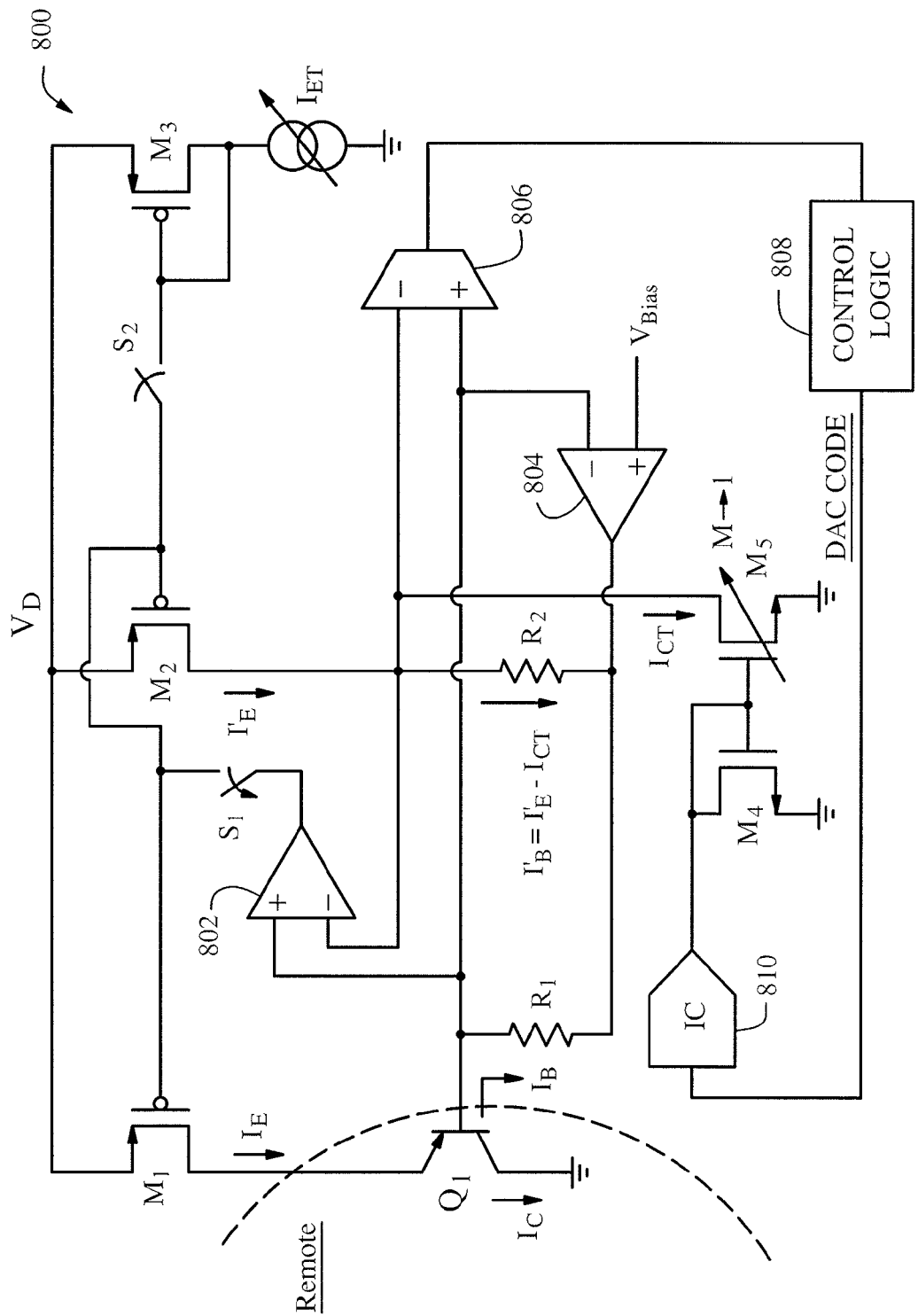
FIG. 8 shows a schematic diagram of an exemplary circuit for determining a first and a second target collector current for the process described for FIG. 7.

FIG. 8 shows a schematic diagram of overview 800 for determining a first and a second target collector current in a manner substantially similar to the process described for FIG. 7. Also, the arrangement and operation of the electronic circuit shown in FIG. 8 is substantially similar to the electronic circuit shown in FIG. 6, albeit different in some ways. In particular, FIG. 8 teaches enabling the first and second target collector currents to be determined based on a selected target emitter current and an adjustable ratio for a variable current mirror prior to measuring the base-emitter voltage for the remotely located transistor. The variable current mirror provides the target collector currents and is formed by the arrangement of MOSFET transistor M4 and M5 where the impedance of M5 is adjustable.

Additionally, the inputs to comparator 806 are coupled to the inverting inputs of bias opamp 804 and opamp 802. The output of the comparator is coupled to control logic 808 which outputs a code for DAC 810. The output of the DAC is coupled to the gates of the MOSFETs M4 and M5. Also, MOSFET M3 is configured to provide a target emitter current and operate as another current mirror with MOSFET transistors M1 and M2. This other current mirror ensured that the target emitter current (Ietarget) flowing through MOSFET M3 is substantially equivalent to the current flowing through MOSFETS M1 (Ie) and M2 (Ie').

During the determination of the first and second target collector currents, the output of opamp 802 may be disconnected from the gates of MOSFETs M1 and M2 by the opening of analog switch S1. Also during this determination, MOSFET M3 is connected to the gates of MOSFETs M2 and M1 by the closing of analog switch S2. After the first and second target collector currents are determined, S1 closes and connects the output of opamp 802 to the gates of MOSFETs M1 and M2; and S2 opens and disconnects MOSFET M3 from the gates of MOSFETs M1 and M2.

Although not shown, a sample and hold circuit could also be provided that disconnects the output of opamp 802 from the circuit during the determination of target collector currents and the measurements of the base-emitter voltage for the remotely located transistor. Additionally, substantially the same arrangement of these components could be employed to determine the temperature of a transistor that is disposed locally, i.e., the transistor can be disposed in the same integrated circuit as the components employed to measure its currents.

Figure 9:
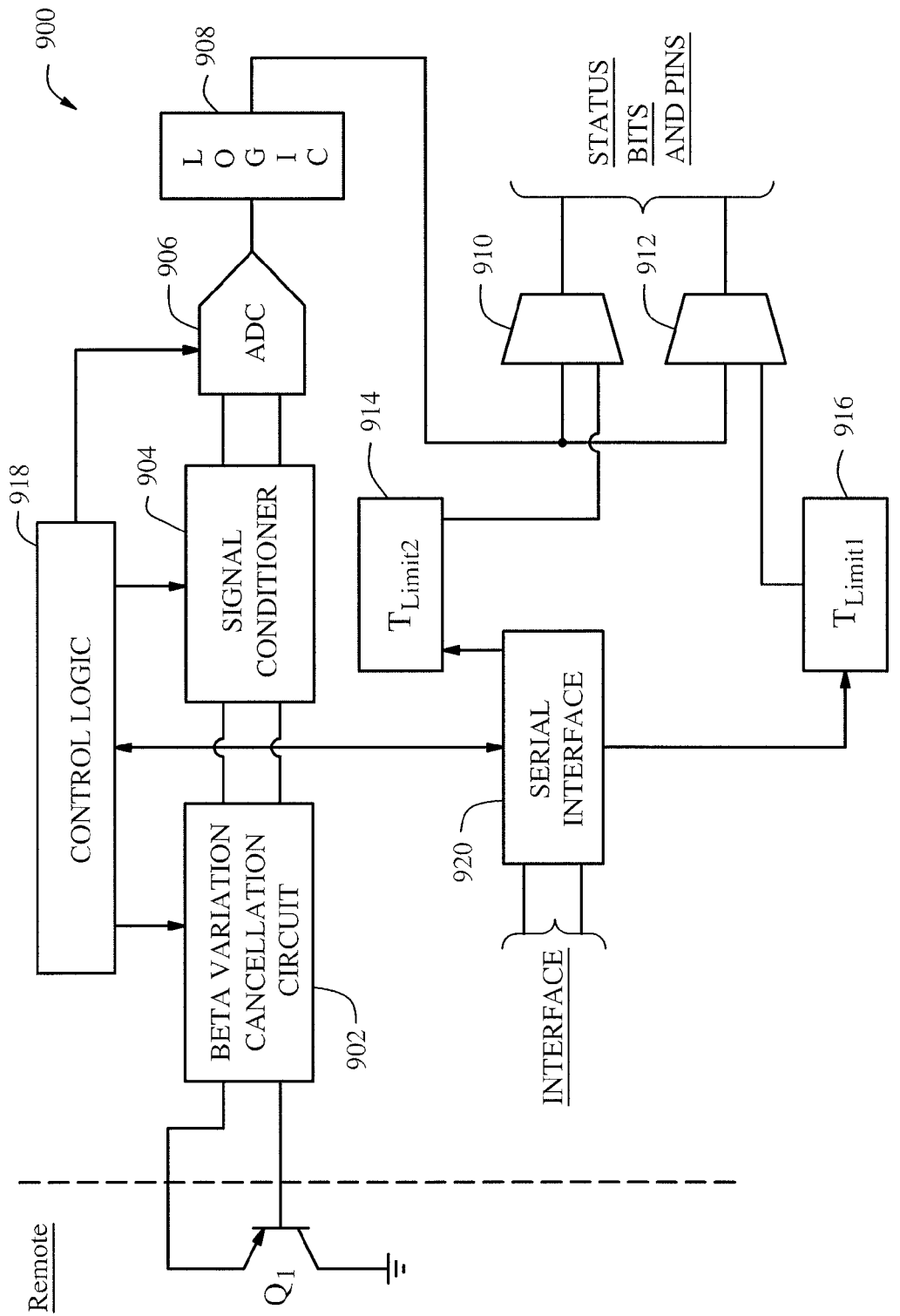
FIG. 9 illustrates an overview of a block diagram for components that measure the temperature of remotely located transistor in accordance with determined target collector currents and base-emitter voltages for the transistor.

FIG. 9 illustrates an overview of block diagram 900 for components to measure the temperature of remotely located transistor Q1 by determining target collector currents and base-emitter voltages for the transistor. In another integrated circuit, the remotely located transistor's base and emitter currents are coupled to beta variation cancellation circuit 902 (exemplary embodiments are discussed above). The analog signal output of circuit 902 is coupled to signal conditioner 904 which can include buffers, low pass filters, and the like, for damping/removing noise. The output of signal conditioner 904 is coupled to the inputs of analog to digital converter (DAC) 906 whose output is coupled to logic component 908.

The output of logic component 908 is coupled to one of the inputs for comparators 910 and 912. The output of these comparators can be provided as external status bits and/or pins for the integrated circuit. Another input to comparator 901 is coupled to an output of Temperature Limit2 (914). Also, the other input to comparator 912 is coupled to an output of Temperature Limit1 (916). Serial interface 920 is coupled to both of the temperature limits (914 and 916) and control logic 918. This control logic is also coupled to circuit 902, signal conditioner 904 and ADC 906.

Additionally, serial interface 920 is arranged so that an interface external to the integrated circuit can be employed to configure the operation of the control logic and the values of the two temperatures limits (914 and 916). The serial interface can also be configured to provide a digitized value that represents a relatively accurate temperature of the remotely located transistor. Furthermore, substantially the same arrangement of these components could be employed to determine the temperature of a transistor that is disposed locally, i.e., the transistor can be disposed in the same integrated circuit as the components employed to measure its currents.

Figure 10:
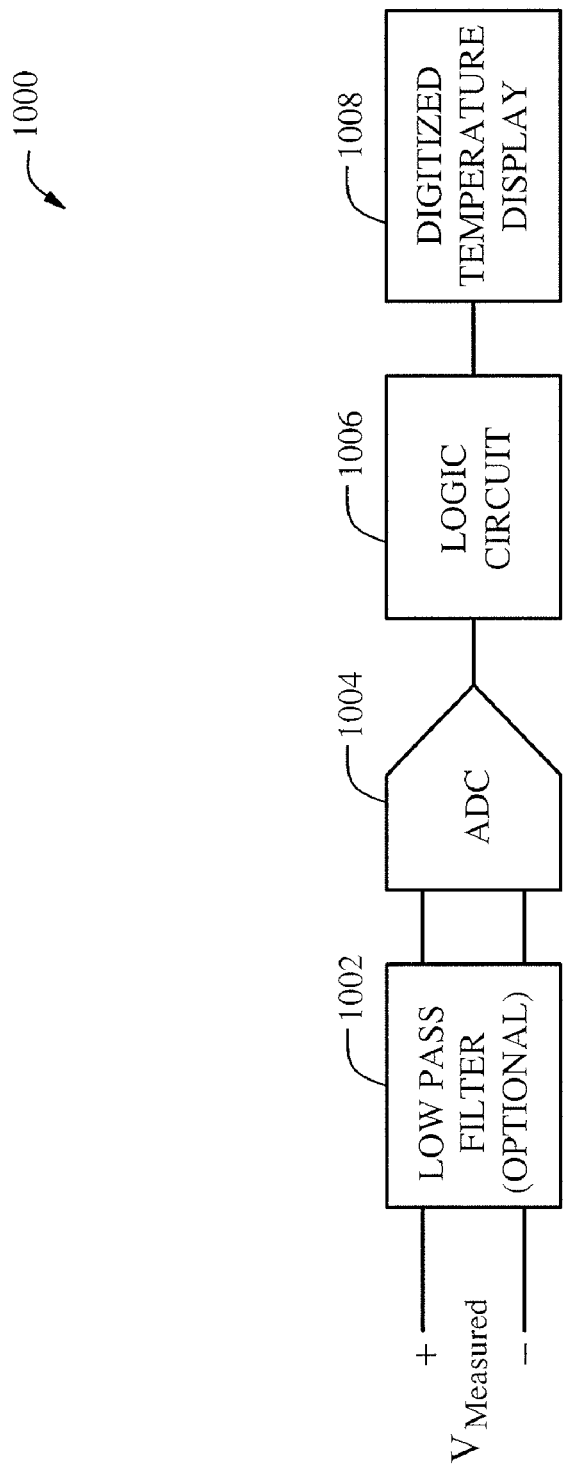
FIG. 10 illustrates a block diagram for an exemplary circuit for measuring the base-emitter voltage of a remotely located transistor in accordance with the invention.

FIG. 10 illustrates a block diagram of overview 1000 for an exemplary circuit for measuring the base-emitter voltage (Vmeasured) of a remotely located transistor The Vmeasured is coupled to optional low pass filter 1002 which provides for reducing/eliminating noise in the measured voltage. The outputs of filter 1002 is coupled to the inputs of analog to digital converter (ADC) 1004 whose output is coupled to logic circuit 1006. The logic circuit converts the digitized measurement of the base-emitter voltage into a format that can be displayed by digitized temperature display 1008. Display 1008 can include numerical displays, colors, pictures, graphics, bar graphs, sounds, status bits, status pins, interfaces, and the like, as a representation of the digitized temperature for the remotely located transistor.

Additionally, in another embodiment, where the remotely located transistor is disposed in series with and/or accessed through one or more resistors, a resistive cancellation circuit may be provided in addition to the circuits discussed above. If these resistive cancellation circuits are used, likely more than two measurements of the base currents and/or base-emitter voltages may be performed to accurately determine the temperature of the resistor.

Moreover, it will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for determining the temperature of a bipolar junction transistor, which has an emitter terminal that carries an emitter current Ie, a base terminal that carries a base current Ib, and a collector terminal that carries a collector current Ic, and wherein said currents are related by Ie=Ib+Ic, the method comprising the steps of:

applying a first emitter current (Ie1) to the emitter terminal of said transistor, wherein said first emitter current (Ie1) comprises a first base current component (Ib1) and a first collector current component (Ic1) with the relationship Ie1=Ib1+Ic1, adjusting the first emitter current (Ie1) while sensing the first base current (Ib1) at the base terminal until a sensed first base current (Ib1) is substantially equal to a difference between the adjusted first emitter current (Ie1) and a first predetermined target collector current (ICT1), sensing a first voltage (Vbe1) between the base and emitter terminals of said transistor while said adjusted first emitter current (Ie1) is applied to said emitter terminal, applying a second emitter current (Ie2) to the emitter terminal of said transistor, wherein said second emitter current (Ie2) comprises a second base current component (Ib2) and a second collector current component (Ic2) with the relationship Ie2=Ib2+Ic2, adjusting the second emitter current (Ie2) while sensing the second base current (Ib2) at the base terminal until a sensed second base current (Ib2) is substantially equal to a difference between the adjusted second emitter current (Ie2) and a second predetermined target collector current (ICT2), with the first and second target collector currents (ICT1, ICT2) differing in magnitude, sensing a second voltage (Vbe2) between the base and emitter terminals of said transistor while said adjusted second emitter current (Ie2) is applied to said emitter terminal, and determining the temperature of said transistor based, at least in part, on a difference between said first and second voltages (Vbe1 and Vbe2).

2. The method of claim 1, wherein the determining the temperature is further based on said first and second collector currents (Ic1 and Ic2) and said first and second voltages (Vbe1 and Vbe2) as used in the following:

$$T = (\Delta Vbe2 - Vbe1)/\eta \frac{k}{q} \ln\left(\frac{Ic1}{Ic2}\right)$$

where T is absolute temperature,
η is the transistor coefficient,
k is Boltzmann's constant, and
q is the electron charge.

3. The method of claim 1, further comprising biasing said transistor above a common mode voltage, with the common mode voltage having a magnitude being determined by measurement circuitry having an associated common mode operating voltage, with the measurement circuitry being used in carrying out the method of determining the temperature.

4. The method of claim 1, wherein the first and second predetermined target collector currents (ICT1) and (ICT2) differ by at least an order of magnitude.

5. A method for determining the temperature of a bipolar junction transistor, which has an emitter terminal that carriers an emitter current Ie, a base terminal that carries a base current Ib, and a collector terminal that carries a collector current Ic, and wherein said currents are related by Ie=Ib+Ic, the method comprising the steps of:

applying a first emitter current (Ie1) to the emitter terminal of said transistor, wherein said first emitter current (Ie1) comprises a first base current component (Ib1) and a first collector current component (Ic1) with the relationship Ie1=Ib1+Ic1, adjusting the first emitter current (Ie1) while sensing the first base current (Ib1) at the base terminal until a sensed first base current (Ib1) is substantially equal to a difference between the adjusted first emitter current (Ie1) and a first target collector current (ICT1), sensing a first voltage (Vbe1) between the base and emitter terminals of said transistor while said adjusted first emitter current (Ie1) is applied to said emitter terminal, applying a second emitter current (Ie2) to the emitter terminal of said transistor, wherein said second emitter current (Ie2) comprises a second base current component (Ib2) and a second collector current component (Ic2) with the relationship Ie2=Ib2+Ic2, adjusting the second emitter current (Ie2) while sensing the second base current (Ib2) at the base terminal until a sensed second base current (Ib2) is substantially equal to a difference between the adjusted second emitter current (Ie2) and a second target collector current (ICT2), with the first and second target collector currents (ICT1, ICT2) having a predetermined ratio N greater than one, sensing a second voltage (Vbe2) between the base and emitter terminals of said transistor while said second adjusted emitter current (Ie2) is applied to said emitter terminal, and determining the temperature of said transistor as a function of said ration N and a different between said first and second voltages (Vbe1 and Vbe2).

6. The method of claim 5, wherein the determining the temperature utilizes the following equation:

$$T = (\Delta Vbe2 - Vbe1)/\eta \frac{k}{q} \ln(N)$$

wherein T is absolute temperature,
η is the transistor coefficient,
k is Boltzmann's constant, and
q is the electron charge.

7. The method of claim 5, further comprising biasing said transistor above a common mode voltage, with the common mode voltage having a magnitude being determined by measurement circuitry having an associated common mode operating voltage, with the measurement circuitry being used in carrying out the method of determining the temperature.

8. The method of claim 5 wherein ratio N is at least 10.

9. Apparatus for use in measuring temperature of a bi-polar transistor, said apparatus including:
- emitter circuitry to be coupled to an emitter electrode of the bi-polar transistor, with the emitter circuitry being operative to provide an adjustable emitter current to the bi-polar transistor;
- base circuitry to be coupled to a base electrode of the bi-polar transistor, with the base circuitry being operative to provide a base signal indicative of a magnitude of the base current of the bi-polar transistor;
- voltage sense circuitry to be coupled to the emitter and base electrodes of the bi-polar transistor; and
- control circuitry operative to cause the emitter circuitry to adjust the emitter current of the bi-polar transistor in response to the base signal so that the bi-polar transistor collector current is at a first collector current value, to cause the voltage sense circuitry to sense a base-emitter voltage of the bi-polar transistor when the collector current is at the first collector current value, to then cause the emitter circuitry to adjust the emitter current of the bi-polar transistor in response to the base signal so that the bi-polar transistor is at a second collector current value different from the first collector current value and to cause the voltage sense circuitry to sense the base-emitter voltage of the bi-polar transistor when the collector current is at the second collector current value.

10. The apparatus of claim 9 wherein the emitter circuitry is further operative to provide an emitter signal indicative of bi-polar transistor emitter current, wherein the apparatus further includes target current circuitry to provide a target signal indicative of the first collector current value and wherein the control circuit is further operative to cause the emitter circuitry to adjust the emitter current in response to the base signal, the emitter signal and the target signal so that the bi-polar transistor collector current is at the first collector current value.

11. The apparatus of claim 10 wherein the target current circuitry is further operative to adjust the target signal in response to a sensed characteristic of the bi-polar transistor.

12. The apparatus of claim 11 wherein the sensed characteristic includes the bi-polar transistor current gain, with a relatively low current gain causing the target signal to indicative a relatively low first collector current value and with a relatively high current gain causing the target signal to indicate a relatively high collector current value.

13. A method for use in measuring temperature of a bi-polar transistor:
- (a) providing emitter current to the bi-polar transistor;
- (b) determining the bi-polar transistor collector current by sensing bi-polar base current at a base terminal of the bi-polar transistor together with monitoring the bi-polar emitter current, with the determining being carrier out independent of any sensing of bi-polar collector current at any collector terminal of the bi-polar transistor;
- (c) adjsuting the emitter current so as to produce first and second bi-polar transistor collector currents of differing magnitudes; and
- (d) sensing a first bi-polar transistor base-emitter voltage when the transistor is conducting the first collector current and sensing a second bi-polar transistor base-emitter voltage when the transistor is conducting the second collector current;
- and determining the temperature of the transistor based, at least in part, on the first and second base-emitter voltages.

14. The method of claim 13 wherein determining the of the bi-polar transistor is based, at least in part, on a difference between the first and second base-emitter voltages.

15. The method of claim 14 wherein the determining a temperature is further based, at least in part, on a ratio of the first and second bi-polar collector currents.

16. The method of claim 13 further including producing an emitter signal indicative of the bi-polar emitter current, a base signal indicative of the bi-polar base current and a target signal indicative of a desired bi-polar collector current and wherein the base and emitter signals are used in the determining of the bi-polar collector current and wherein the target signal is used in the adjsuting the emitter current so as to produce the first bi-polar transistor collector current.

17. The method of claim 16 wherein the target signal is indicative of the first bi-polar collector current, wherein the producing a target signal includes sensing a characteristic of the bi-polar transistor and adjusting the target signal in response to the characteristics.

18. The method of claim 17 wherein the characteristic sensed includes the current gain of the bi-polar transistor, with the target signal being set to a value indicative of a relatively low target collector current magnitude when a relatively low current gain is sensed and with the target signal being set of another value indicative of a relatively high target collector current magnitude when a relatively high current gain is sensed.

19. A method for use in measuring temperature of a bi-polar transistor comprising:
- (a) providing a first adjustable emitter current to an emitter terminal of the bi-polar transistor;
- (b) sensing a first base current at a base electrode of the bi-polar transistor while adjsuting the first adjustable emitter current so as to produce a first collector current in the bi-polar transistor substantially equal in magnitude to a first collector current value;
- (c) providing a second adjustable emitter current to the emitter terminal of the bi-polar transistor;
- (d) sensing a second base current at the base electrode of the bi-polar transistor while adjsuting the second adjustable emitter current so as to produce a second collector current in the bi-polar transistor substantially equal in magnitude to a second collector current value, with the first and second collector current values differing in magnitude; and
- (e) determining a temperature of the bi-polar transistor based, at least in part, on a ratio of the first and second collector current values.

20. The method of claim 19 further including sensing a first base-emitter voltage of the bi-polar transistor when the bi-polar transistor is conducting the first collector current substantially equal in magnitude to the first collector current value and further including sensing a second base-emitter voltage of the bi-polar transistor when the bi-polar transistor is conducting the second collector current substantially equal in magnitude to the second collector current values, with the determining being further based, at least in part, on a difference in magnitude of the first and second sensed base-emitter voltages.

21. The method of claim 19 wherein the determining the temperature is carried out independent of directly sensing current at any collector terminal of the bi-polar transistor.

22. The method of claim 19 wherein the sensing a first base current includes producing a base signal indicative of the bi-polar transistor base current, with the base signal being used when sensing the first base current while adjusting the first adjustable emitter current so as to produce the first collector current value.

23. The method of claim 22 wherein the base signal is a current signal having a magnitude that is substantially equal to a magnitude of the bi-polar transistor base current.

24. The method of claim 22 wherein the base signal is produced using a current mirrior circuit having a current mirror input coupled to the base electrode of the bi-polar transistor.

25. The method of claim 22 wherein the adjusting the first adjustable emitter current includes producing an emitter signal indicative of the bi-polar emitter current, with the emitter signal being used when adjsuting the first adjustable emitter current so as to produce the first collector current value.

26. The method of claim 25 wherein the emitter signal is another current signal having a magnitude that is substantially equal to a magnitude of the bi-polar transistor emitter current.

27. The method of claim 19 wherein the adjsuting the first adjustable emitter current so as to produce a first collector current in the bi-polar transistor substantially equal in magnitude to a first collector current includes producing a target signal indicative of the first collector current value.

28. The method of claim 27 further including producing a base signal indicative of the bi-polar transistor base current and producing an emitter signal indicative of the bi-polar transistor emitter current and wherein the adjsuting the first adjustable current so as to product a first collector current in the bi-polar transistor substantially equal in magnitude to a first collector current value is carried out using the base signal, the emitter signal and the target signal.

29. The method of claim 28 wherein the adjsuting the first adjustable current so as to product a first collector current in the bi-polar transistor substantially equal in magnitude to a first collector current value by changing the emitter current until a magnitude of the emitter signal is substantially equal to a sum of the base signal and the target signal.

30. The method of claim 27 wherein the producing the target signal includes sensing characteristics of the bi-polar transistor and adjsuting the target signal in response to the characteristics.

31. The method of claim 30 wherein the characteristic sensed includes the current gain of the bi-polar transistor, with the target signal being set to a value indicative of a relatively low target collector current magnitude when a relatively low current gain is sensed and with the target signal being set to another value indicative of a relatively high target collector current magnitude when a relatively high current gain is sensed.

32. The method of claim 30 wherein the adjsuting the target signal is carried out prior to the adjsuting the first adjustable emitter current so as to produce a first collector current substantially equal in magnitude to the first collector current value.

* * * * *